(12) United States Patent
Carr et al.

(10) Patent No.: US 9,273,478 B2
(45) Date of Patent: Mar. 1, 2016

(54) MOBILE LIFTING ASSEMBLY

(71) Applicants: Andrew Laurence Carr, New South Wales (AU); Symond Anthony Carr, New South Wales (AU)

(72) Inventors: Andrew Laurence Carr, New South Wales (AU); Symond Anthony Carr, New South Wales (AU)

( * ) Notice: Subject to any disclaimer, the term of this patent is extended or adjusted under 35 U.S.C. 154(b) by 247 days.

(21) Appl. No.: 13/757,551

(22) Filed: Feb. 1, 2013

(65) Prior Publication Data

US 2013/0149074 A1 Jun. 13, 2013

Related U.S. Application Data

(62) Division of application No. 12/747,493, filed as application No. PCT/AU2009/000068 on Jan. 22, 2009, now abandoned.

(30) Foreign Application Priority Data

Mar. 25, 2008 (AU) ................................ 2008901428

(51) Int. Cl.
*B60P 3/07* (2006.01)
*E04G 21/16* (2006.01)
*B60P 1/02* (2006.01)
*B66D 1/00* (2006.01)
*B66F 9/06* (2006.01)

(52) U.S. Cl.
CPC . *E04G 21/16* (2013.01); *B60P 1/02* (2013.01); *B66D 1/00* (2013.01); *B66F 9/06* (2013.01); *B62B 2202/62* (2013.01)

(58) Field of Classification Search
CPC ........................................................ B60P 3/07

USPC .............. 414/458, 495, 529, 538; 280/33.998
See application file for complete search history.

(56) References Cited

U.S. PATENT DOCUMENTS

| 3,365,085 A * | 1/1968 | Wilson .......................... 414/471 |
| 3,786,951 A | 1/1974 | Ruff et al. |
| 3,982,768 A | 9/1976 | Getman |

(Continued)

FOREIGN PATENT DOCUMENTS

| CA | 2 568 964 A1 | 8/2007 |
| DE | 35 09 316 A1 | 9/1986 |

(Continued)

OTHER PUBLICATIONS

Examination Report having issue for the corresponding New Zealand patent application No. 585955.
Supplementary European Search Report for corresponding European patent application No. 09725676 dated Mar. 26, 2012.

*Primary Examiner* — Jonathan Snelting
(74) *Attorney, Agent, or Firm* — Arent Fox LLP (57) ABSTRACT

According to one aspect of the invention there is provided a mobile lifting assembly comprising a body frame with one or more wheels for transporting a structural member, and four individually controllable lifting devices connected to the body frame for repositioning (such as raising, lowering, tilting or rolling) of the structural member. According to another aspect of the invention there is provided a mobile lifting assembly comprising a body frame being adapted to locate on a supporting surface, a lifting device connected to the body frame for raising or lowering a structural member, and a skid resting on the supporting surface underneath the body frame and being arranged to contact the body frame to distribute forces imparted by the structural member on the body frame across the supporting surface.

11 Claims, 6 Drawing Sheets

(56) References Cited

U.S. PATENT DOCUMENTS

| | | | |
|---|---|---|---|
| 4,062,465 A * | 12/1977 | Kovatch et al. | 414/499 |
| 4,077,535 A * | 3/1978 | Oriol | 414/498 |
| 4,721,429 A * | 1/1988 | Fujita et al. | 414/458 |
| 4,995,772 A * | 2/1991 | Biggio | 414/458 |
| 5,154,564 A * | 10/1992 | Koch | 414/506 |
| 7,806,644 B2 * | 10/2010 | Yuyama et al. | 414/331.06 |
| 2006/0210382 A1 * | 9/2006 | Mountz et al. | 414/498 |

FOREIGN PATENT DOCUMENTS

| | | |
|---|---|---|
| DE | 196 47 110 A1 | 5/1998 |
| DE | 198 38 254 A1 | 3/2000 |
| SU | 1209483 A | 2/1986 |

* cited by examiner

MOBILE LIFTING ASSEMBLY

CROSS-REFERENCED TO RELATED APPLICATION

This application is a Divisional Application of U.S. patent application Ser. No. 12/747,493 filed Jun. 10, 2010, which is a National Stage entry of International Application No. PCT/AU2009/000068, filed Jan. 22, 2009 which is based upon and claims the benefit of priority of the prior Australian Patent Application No. 2008901428, filed Mar. 25, 2008, the disclosure of the prior application is hereby incorporated in its entirety by reference.

FIELD OF THE INVENTION

The present invention broadly relates to a mobile lifting assembly for manipulating structural members, such as an I-beam. More particularly, the invention relates to a mobile lifting assembly for lifting and transporting structural members in construction or mining applications.

BACKGROUND TO THE INVENTION

Structural members such as I-beams are often required to reinforce structures in a construction site or a mining site. The angle and placement of the structural members are crucial to the reinforcement, which necessitates the accurate positioning of the structural members. Ideally the structural members, when being installed for structural reinforcement, can be manipulated to be placed at various positions and orientations.

Often, one or more forklifts are used for manipulating structural members. One of the disadvantages of using forklifts is the height restrictions in a construction site or a mining site. For example, when a multi-level car park is to be converted into a shopping complex, every second floor of the car park may need to be knocked down to satisfy the height requirements for a shopping complex. In this situation, structural members may be required for structural reinforcement. The use of forklifts in this situation may not be possible because the forklifts may be too tall to enter a car park level. Other disadvantages of using forklifts also include the need for a number of forklifts and a number of forklift operators. Height restrictions in a mining site may be even more stringent that those for a car park.

SUMMARY OF THE INVENTION

According to one aspect of the invention there is provided a mobile lifting assembly comprising:
  a body frame with one or more wheels for transporting a structural member; and
  four individually controllable lifting devices connected to the body frame for repositioning of the structural member.

Preferably the lifting devices each include a hydraulic ram.
Preferably the four lifting devices are arranged as two (2) pairs of devices spaced longitudinally along the body frame which is generally rectangular. More preferably the mobile lifting assembly includes two (2) cradles connected to respective of the two (2) pairs of lifting devices. Even more preferably the two (2) cradles are each operatively coupled to the hydraulic rams of the corresponding pair of lifting device for repositioning of the structural member.
Preferably at least one of the four lifting devices includes a load monitoring device, such as a load cell.

Preferably the four individually controllable lifting devices may be controlled by a single control device.
Preferably the body frame includes a first pair and a second pair of wheels and the body frame is in the form of a trailer. More preferably at least one of the pairs of wheels is coupled to a turntable. Even more preferably the turntable is rotatable by 360 degrees.
Preferably the mobile lifting assembly includes an idler roller to assist with sliding of the structural member across the mobile lifting assembly. More preferably the mobile lifting assembly includes a winch for pulling the structural member across the mobile lifting assembly on the idler roller.
Preferably the mobile lifting assembly is arranged to couple with at least one other mobile lifting assembly to form a train of mobile lifting assemblies.

According to another aspect of the invention there is provided a mobile lifting assembly comprising:
  a body frame being adapted to locate on a supporting surface;
  a lifting device connected to the body frame for raising or lowering a structural member; and
  a skid resting on the supporting surface underneath the body frame and being arranged to contact the body frame to distribute forces imparted by the structural member on the body frame across the supporting surface.

Preferably the skid includes a hydraulic ram for adjusting the height of the skid for contacting the body frame. More preferably said hydraulic ram is one of a plurality of hydraulic rams.
Preferably the skid includes an upper frame for contacting the body frame. More preferably the plurality of hydraulic rams are arranged for adjusting the tilt of the upper frame such that the load exerted by the mobile lifting assembly on the supporting surface is adjustably distributed.
Preferably the body frame includes supporting members. More preferably the supporting members are wheels, and the body frame is in the form of a trailer.
Preferably the skid includes another load monitoring device, such as a load cell.

DETAILED DESCRIPTION OF THE PREFERRED EMBODIMENTS

Figure 1:
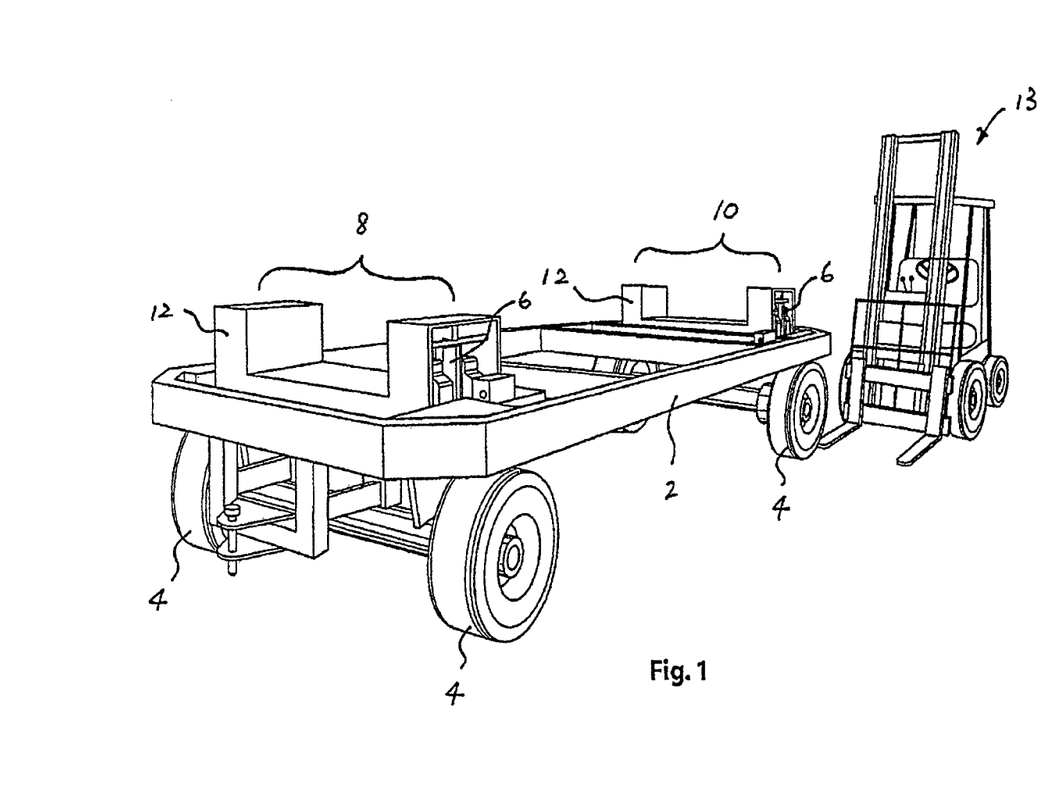
FIG. 1 Perspective view of a first embodiment of the mobile lifting assembly, and a forklift.

The present invention relates to a mobile lifting assembly for transporting and manipulating structural members, such as an I-beam, in construction or mining applications.
In one aspect of the invention, as shown in FIG. 1, the mobile lifting assembly comprises a primary unit or a body frame 2 with one or more wheels 4 for transporting a structural member (which is not shown in FIG. 1), and at least two lifting devices 6 connected to the body frame 1 for repositioning of the structural member. FIG. 1 shows an embodiment with four lifting devices 6, arranged as two pairs (8 and 10) of lifting devices 6 spaced longitudinally along the body frame 2, which, in the embodiment shown in FIG. 1, is rectangular.

In some embodiments, the lifting devices 6 may each include a hydraulic ram for raising or lowering the corresponding lifting device. The lifting devices 6 may be individually controllable such that the structural member can be repositioned, such as raised, lowered, rolled or tilted, at an angle relative to the ground or a supporting surface on which the mobile lifting assembly rests. The lifting devices 6 and hydraulic rams may be controlled collectively by a single control device with control over individual lifting devices and hydraulic rams.

In the embodiment shown in FIG. 1, each of the two pairs (8 and 10) of lifting devices 6 is connected to a cradle 12, in which the structural member may rest. The two cradles 12, which are shown as having a U-shape, are each operatively coupled to the hydraulic rams of the corresponding pair (8 and 10) of lifting devices 6.

In some embodiments, at least one of the lifting devices 6 may include a load monitoring device, such as a load cell.

In the embodiment shown in FIG. 1, the body frame 2 includes a first pair and a second pair of wheels 4 (only three wheels can be seen in FIG. 1, with a forth wheel being blocked by the body frame 2).

For comparison purposes, a typically sized forklift 13 is also shown in FIG. 1. As shown, this embodiment of the mobile lifting assembly is only about half the height of the forklift. The use of a mobile lifting assembly may therefore allow transportation and manipulation of a structural member in an environment, such as a mine or construction site, with a height restriction that would exclude the use of a forklift.

Figure 2:
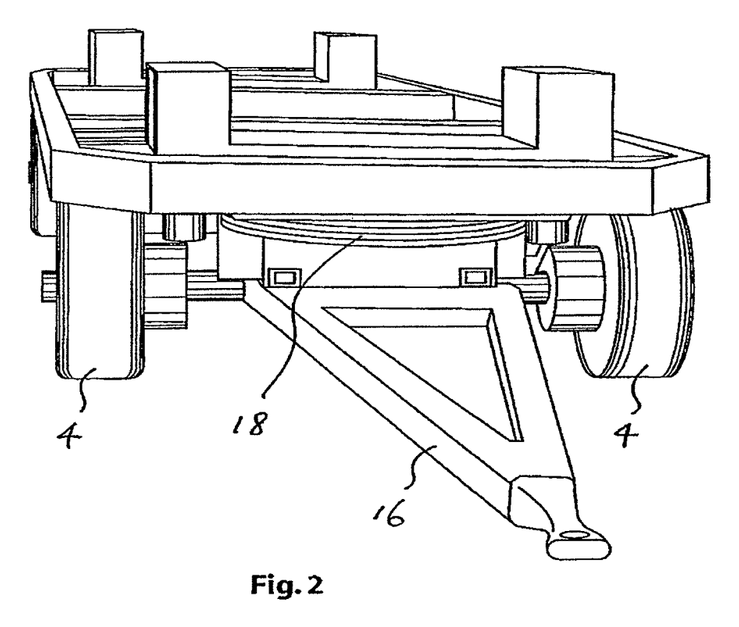
FIG. 2 End view of a second embodiment of the mobile lifting assembly.

FIG. 2 shows the end view of another embodiment of the mobile lifting assembly and shows a pair of wheels 4. This embodiment is similar to the one shown in FIG. 1, except that the body frame 2 in this embodiment includes a drawbar 16, and is in the form of a trailer. The pair of wheels 4 shown in FIG. 2 is coupled to a turntable 18. The turntable 18 may be rotatable by 360 degrees. The turntable 18 may allow the mobile lifting assembly to turn, whereby the mobile lifting assembly is not restricted to movement in a single direction.

Figure 3:
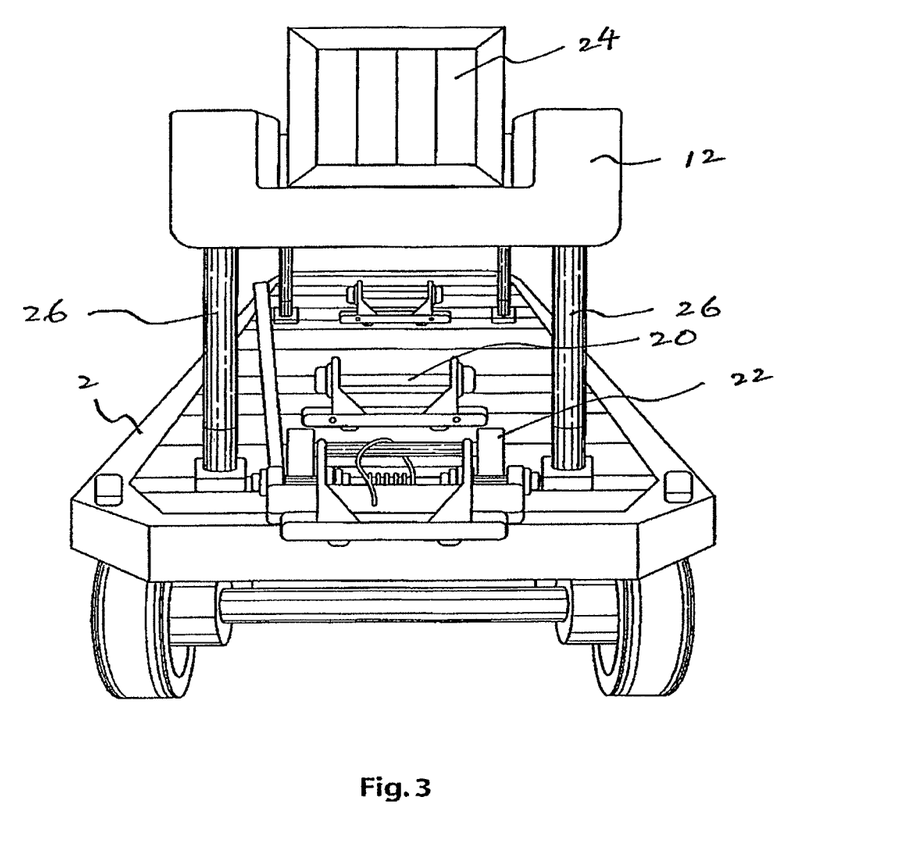
FIG. 3 End view of a third embodiment of the mobile lifting assembly with a winch and a idler roller.

FIG. 3 shows an end view of another embodiment of the mobile lifting assembly. FIG. 3 shows the mobile lifting assembly together with a structural member 24 in one of the cradles 12, where the cradle and the structural member 24 have been raised, exposing two hydraulic rams 26. In this embodiment, the mobile lifting assembly includes an idler roller 20 to assist with, when the structural member 24 is lowered to the level of the idler roller 20, sliding of the structural member 24 across the mobile lilting assembly. The mobile lifting assembly may also include a winch 22 for pulling the structural member across the mobile lifting assembly on the idler roller 20.

Figure 4:
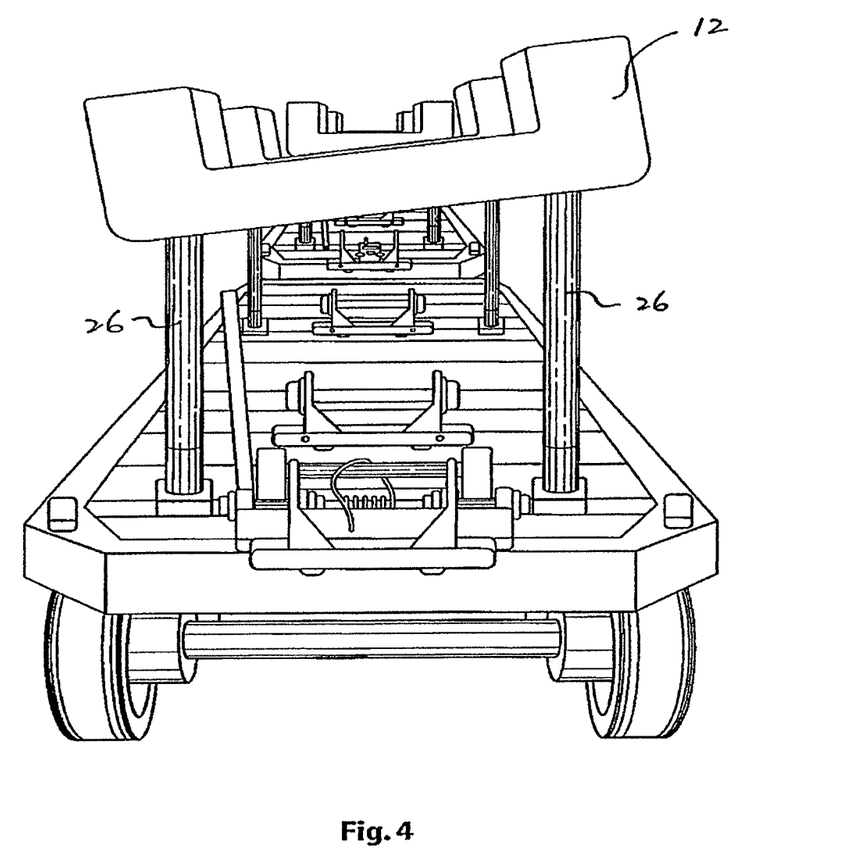
FIG. 4 Partial end view of the third embodiment of the mobile lifting assembly with a cradle being positioned at an angle.

FIG. 4 shows a partial end view of a mobile lifting assembly, where one of the cradles 12 is positioned at an angle, allowing sliding movement or rolling of the structural member (structural member not entirely shown in FIG. 4), as in the roll manoeuvre of airplanes. This may be achieved by individually controlling the extension of the two hydraulic rams 26 connected to the cradle 12.

FIG. 4 also shows at least one other mobile lifting assembly. The two or more mobile lifting assemblies may be arranged, in such a way as shown, to couple with one another to form a train of mobile lifting assemblies. This arrangement of more than one mobile lifting assembly allows for structural members that are substantially longer than the separation distance of the two cradles 12 on a mobile lifting assembly to be supported and repositioned or manipulated (raised, lowered, rolled or tilted).

Figure 5:
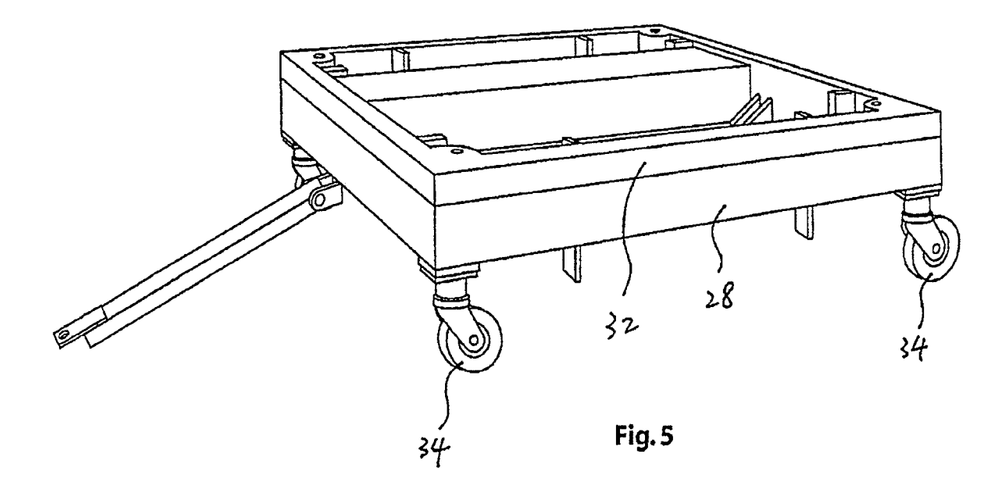
FIG. 5 Perspective view of an example of a skid.

In another aspect of the present invention, the Mobile lifting assembly includes a secondary unit or a skid to distribute the point load of the mobile lifting assembly on a supporting surface, such as a concrete floor in a building site or any ground surface in a mine. An example of a skid 28 is shown in FIG. 5. The skid 28 may also include an upper frame 32 that may be lowered or raised with respect to the supporting surface, thereby adjusting the overall height of the skid 28.

Figure 6:
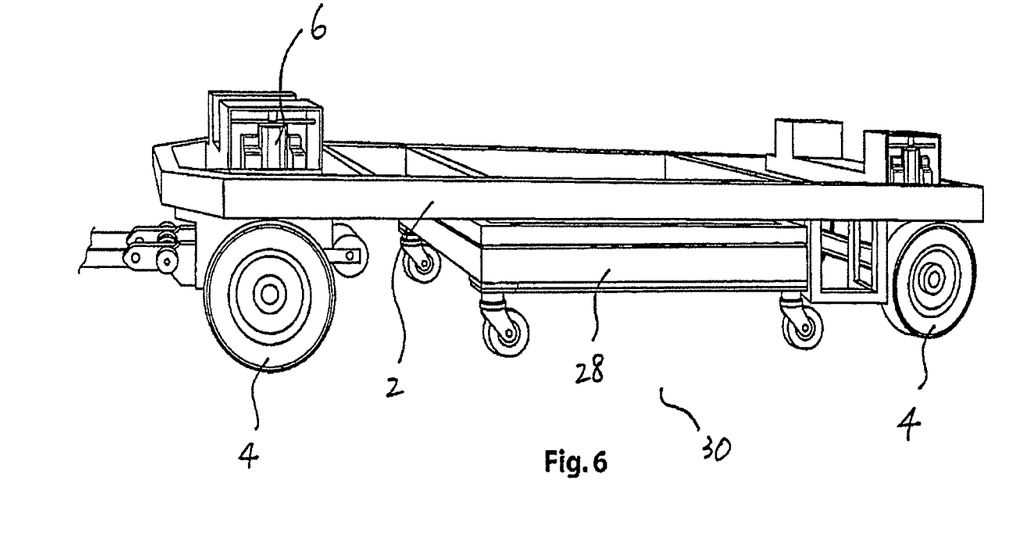
FIG. 6 Perspective view of the first embodiment of the mobile lifting assembly including a skid.

In this aspect of the invention, the mobile lifting assembly generally comprises, as shown in FIG. 6 which are the same embodiment of different views, a body frame 2 being adapted to locate on the supporting surface 30, a lifting device 6 connected to the body frame 2 for raising or lowering a structural member (not shown in FIG. 6), and a skid 28 resting on the supporting surface 30 underneath the body frame 2 and being arranged to contact the body frame 2 to distribute forces imparted by the structural member on the body frame 2 across the supporting surface 30. The skid 28 as shown in FIG. 6 is not in contact with the body frame 2.

The skid 28 may include at least one hydraulic ram for adjusting the height of the skid 28, by adjusting the height of the upper frame 32 relative to the supporting surface, for contacting the body frame 2. In general, the at least one hydraulic ram is one of a plurality of hydraulic rams (such as a ram in each corner) arranged for adjusting the tilt or plane of the upper frame 32 of the skid 28 such that the load exerted by the mobile lifting assembly on the supporting surface 30 is adjustably distributed, preferably evenly distributed. The skid 28 may also include another load monitoring device, such as a load cell at each of the hydraulic rams.

The skid 28, as shown in FIG. 5, may also include caster wheels 34 for the movement of the skid 28. In practice, the body frame 2 and the skid 28 may be required to move to a supporting surface that does not have a particularly high point loading capacity. In this situation, the upper frame 32 of the skid 28 may first be raised to make contact with the body frame 2, and appropriately tilted to evenly distribute the load among the wheels 4 of the body frame 2 and caster wheels 34 of the skid 28. The load cells of each of the hydraulic rams may assist in measuring and determining a suitable height and tilt or plane of the upper frame 32 to evenly distribute the load. The skid 28 together with the body frame 2 may then move to the desired location of the supporting surface, thereby reducing the risk of localised failure of the supporting surface.

The body frame 2 of the embodiment shown in FIG. 6, like some of the previously mentioned embodiments, has supporting members or wheels 4. The body frame 2 may also be in the form of a trailer.

All features mentioned in the aspect without a skid may also apply to the aspect that includes a skid.

Now that several preferred embodiments of the present invention have been described it will be apparent to those skilled in the art that the mobile lifting assembly has the following advantages:

The mobile lifting assembly with the underlying skid or secondary unit can be positioned on a relatively weak supporting surface or floor by distribution the load between the primary and the secondary units without compromising the integrity of the floor.

Structural members may be manipulated in various ways, including being raised, lowered, slid, rolled and tilted, for the accurate placement of the structural members, which is often required for structural reinforcement.

The mobile lifting assembly may be custom built with a variety of heights, after considering height restrictions for a specific application.

If the lifting devices are all controlled by a single control device with control over individual lifting devices, the mobile lifting assembly may be operated with one person or only limited number of personnel.

Those skilled in the art will appreciate that the invention described herein is susceptible to variations and modifications other than those specifically described. For example, the mobile lifting assembly may include any number of lifting devices as required. Both the first and the second pair of wheels on the body frame may be connected to their respective turntable, providing 360° rotation of both pairs of wheels. The cradles may be V-shaped, with multiple furrows or channels, or any shape other than a U-shape.

All such variations and modifications are to be considered within the ambit of the present invention the nature of which is to be determined from the foregoing description.

The invention claimed is:

1. A mobile lifting assembly comprising: a body frame with one or more supporting members for transporting a structural member across a supporting surface; a plurality of individually controllable lifting devices connected to the body frame for repositioning of the structural member; and a skid resting on the supporting surface underneath the body frame and being arranged to contact the body frame to distribute forces imparted by the mobile lifting assembly and the structural member across the supporting surface, said forces distributed between at least one of the supporting members of the body frame and the skid during movement of the body frame and the skid to a desired location of the supporting surface, the skid including an upper frame for contacting the body frame and one or more hydraulic rams for adjusting a height of the skid for contacting the body frame and for adjusting a tilt of the upper frame such that the forces distributed across the supporting surface are adjustably distributed.

2. A mobile lifting assembly as claimed in claim 1, wherein the plurality of lifting devices each comprises a hydraulic ram.

3. A mobile lifting assembly as claimed in claim 2, wherein the plurality of lifting devices are arranged as two pairs of lifting devices spaced longitudinally along the body frame which is generally rectangular.

4. A mobile lifting assembly as claimed in claim 3, further comprising two cradles connected to respective ones of the two pairs of lifting devices.

5. A mobile lifting assembly as claimed in claim 4, wherein the two cradles are each operatively coupled to the hydraulic rams of the corresponding pair of lifting devices for raising, lowering, tilting or rolling of the structural member.

6. A mobile lifting assembly as claimed in claim 1, wherein the supporting members include a first pair and a second pair of wheels and the body frame is in the form of a trailer.

7. A mobile lifting assembly as claimed in claim 6, wherein at least one of the pairs of wheels is coupled to a turntable.

8. A mobile lifting assembly as claimed in claim 7, wherein the turntable is rotatable by 360 degrees.

9. A mobile lifting assembly as claimed in claim 1, further comprising an idler roller to assist with sliding of the structural member across the mobile lifting assembly.

10. A mobile lifting assembly as claimed in claim 9, wherein the mobile lifting assembly comprises a winch for pulling the structural member across the mobile lifting assembly on the idler roller.

11. A mobile lifting assembly as claimed in claim 1 wherein the forces imparted by the mobile lifting assembly and the structural member across the supporting surface are evenly distributed between said at least one of the supporting members of the body frame and the skid.

* * * * *